United States Patent Office 3,535,557

Patented Oct. 20, 1970

3,535,557
STORAGE TIME SUBTRACTION CIRCUIT

Jimmy D. Rogers, Austin, and Joseph J. Wormser, Dallas, Tex., assignors, by mesne assignments, to LTV Electrosystems, Inc., Dallas, Tex., a corporation of Delaware Filed Sept. 5, 1967, Ser. No. 665,487
Int. Cl. H03k 5/00; H03f 3/26
U.S. Cl. 307—268 10 Claims

ABSTRACT OF THE DISCLOSURE

An apparatus for driving a transistor circuit, especially a push-pull circuit, includes means for compensating for collector current storage characteristics of the transistors. In one embodiment, the driving signal energizes a monostable multivibator to produce pulses corresponding to the transistor storage time, and these pulses are subtracted from the driving signal pulses, for example, from the leading edges of the driving signal pulses.

Figure 1:
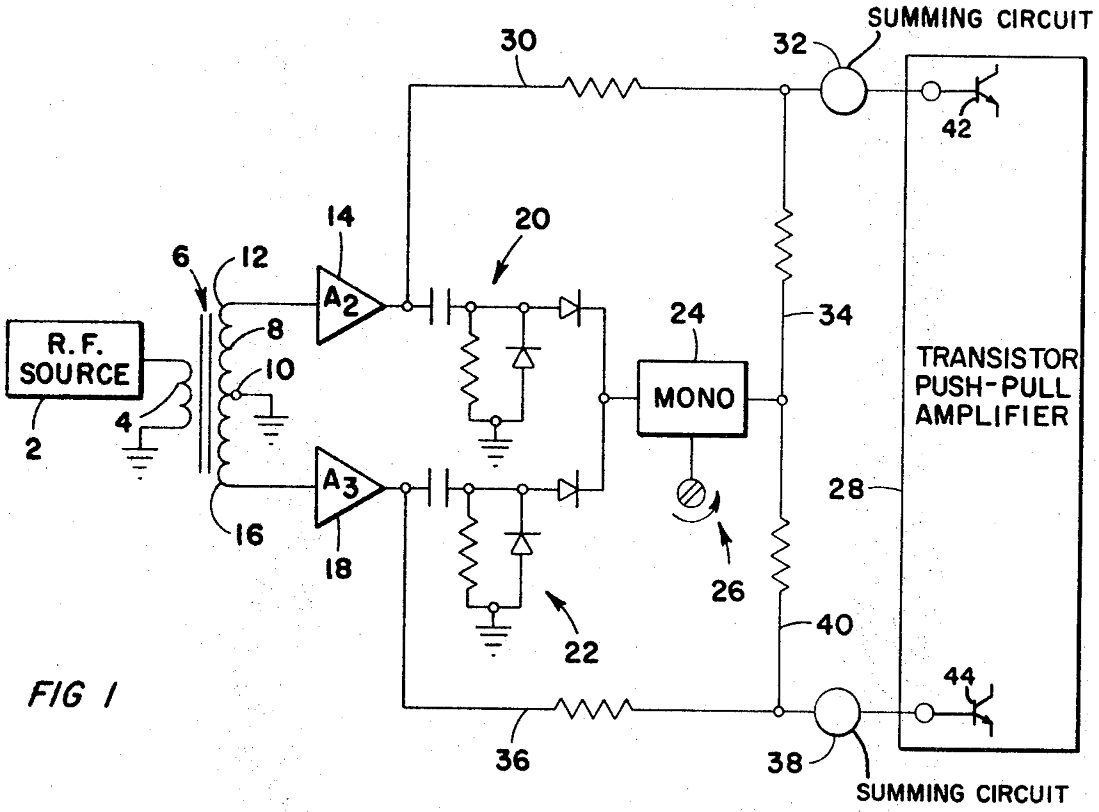

This invention relates to power amplifier transistors and is particularly directed to means for compensating for the storage time of power amplifier transistors over a broad frequency range.

Many amplifier uses require that precise conduction angles be maintained. For example, in push-pull circuits, it is necessary to control the exactness of collector waveforms to prevent cross-over distortion, which occurs when both sides of the circuit are conducting simultaneously. Moreover, transmitters for radio navigation systems must maintain half-cycle waveform accuracies to within one part per thousand in order to obtain navigational precision.

Unfortunately, high power transistors, when operated as switching amplifiers have a characteristic storage of collector current which causes current to continue to flow for a short time after the driving pulse has ceased. The duration of this current flow is essentially independent of the frequency of the driving pulse and depends upon the magnitude of the collector current and the amount of overdrive of the driving pulse. Techniques, such as shaping of the waveforms supplied to the base electrode, are available to minimize the storage time and hold it constant. However, it is not possible to completely eliminate storage time.

Numerous techniques have been proposed heretofore to compensate for storage time. However, none of the prior art techniques have been entirely satisfactory. Thus, it has been proposed to drive the transistors with a Class C driving technique wherein a hold-off bias level is employed to establish the collector current pulse width on a half sine wave of driving voltage. However, when sampling a sine wave, the output pulse width must be a fixed ratio of the sine wave period. Consequently, since the storage time is constant, the sampling level must be adjusted for each frequency of operation. Hence, broad band operation is not feasable.

These disadvantages of the prior art are overcome with the present invention and a driving technique is provided whereby a portion of the driving pulsewidth equal to the duration of the storage time is subtracted from the driving pulse. As a result, the width of the driving pulse will be less than the desired pulse width. However, since the transistor continues to conduct during the storage time, the output pulsewidth of the transistor will be precisely the desired pulsewidth. Moreover, in accordance with the present invention, the subtraction is performed after the width of the driving pulse has been established. Thus, the technique of the present invention is independent of frequency and may be employed, without readjustment, over an extremely broad frequency band.

The advantages of the present invention are preferably attained by squaring the radio frequency drive signal, differentiating the resulting square wave to obtain a trigger pulse corresponding to the leading edge of each cycle of the square wave, applying the trigger pulse to switch a monostable multivibrator to its conductive state. adjusting the multivibrator to cause the duration of the conductive state thereof to be equal to the storage time of the transistor to be controlled, subtracting the output of the multivibrator from each cycle of the squared drive signal, and applying the remainder signal to drive the transistor to be controlled.

Accordingly, it is an object of the present invention to provide improved methods and apparatus for driving power amplifier transistors.

Another object of the present invention is to provide improved methods and apparatus for compensating for the storage time of power amplifier transistors.

An additional object of the present invention is to provide methods and apparatus for compensating for the storage time of power amplifier transistors over a broad frequency band.

A further object of the present invention is to provide methods and apparatus for subtracting a portion of the radio frequency drive signal equal to the duration of the storage time of the transistor to be controlled.

A specific object of the present invention is to provide methods and apparatus for squaring the radio frequency drive signal, differentiating the resulting square wave to obtain a trigger pulse corresponding to the leading edge of each cycle of the square wave, applying the trigger pulse to switch a monostable multivibrator to its conductive state, adjusting the multivibrator to cause the duration of the conductive state thereof to be equal to the storage time of the transistor to be controlled, subtracting the output of the multivibrator from each cycle of the squared drive signal, and applying the remainder signal to drive the transistor to be controlled.

These and other objects and features of the present invention will be apparent from the following detailed description taken with reference to the figures of the accompanying drawing.

Figure 2:
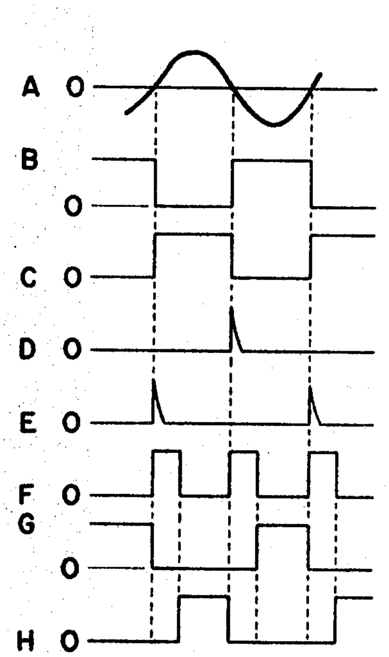

In the drawing:

FIG. 1 is a diagrammatic representation of a storage time subtraction circuit embodying the present invention; and FIG. 2 is a diagrammatic representation of the voltage waveforms appearing at designated points in the circuit of FIG. 1 displayed as a function of time.

In that form of the present invention chosen for purposes of illustration, FIG. 1 shows a circuit embodying the present invention for driving a conventional push-pull transistor amplifier 28. In FIG. 1, the amplifier 28 is symbolically illustrated as including one transistor 42 connected to the output of summing circuit 32, and another transistor 44 connected to the output of summing circuit 38. The amplifier 28 is not illustrated in detail since its circuit is not the subject of the invention, and amplifiers of this type are conventional. As shown, a radio frequency driving signal, represented by curve A of FIG. 2, is supplied by a suitable source 2 to the primary winding 4 of a transformer 6 having a secondary winding 8 with a grounded center-tap, as indicated at 10. One end 12 of the secondary winding 8 supplies signals to a first saturating amplifier 14, while the other end 16 of the secondary winding 8 supplies signals to a second saturating amplifier 18. The outputs of amplifiers 14 and 18 will be square-wave signals and the output of amplifier 14, represented by curve B of FIG. 2, will be 180 degrees out of phase with the output of ampifier 18, represented by curve C of FIG. 2. The output of amplifier 14 is differentiated by a

STORAGE TIME SUBTRACTION CIRCUIT

Filed Sept. 5, 1967

JIMMY D. ROGERS
JOSEPH J. WORMSER
INVENTORS
BY Robert M. Sperry
ATTORNEY differentiating each of said square-wave signals to drive trigger pulse signals, applying said trigger pulse signals to switch a monostable multivibrator from a non-conductive state to a conductive state, adjusting said multivibrator to cause the duration of said conductive state to be equal to the storage time of said transistors, subtracting the output signals of said multivibrator from said first square-wave signal to obtain a first remainder signal, subtracting the output signals of said multivibrator from said second square-wave signal to obtain a second remainder signal, applying said first remainder signal to drive the transistor on one side of said amplifier, and applying said second remainder signal to drive the transistor on the opposite side of said amplifier.

5. Apparatus for driving a transistor having collector current storage time characteristics comprising:

means for generating a radio frequency driving signal, means for generating a pulse-type signal having a pulse width equal to the duration of the storage time of said transistor, means for synchronizing said pulse-type signals with said radio frequency driving signal, means for subtracting said pulse-type signal from said driving signal to obtain a remainder signal, and means applying said remainder signal to drive said transistor.

6. Apparatus for driving a transistor having collector current storage time characteristics, comprising:

means for generating a driving signal, means for squaring the waveform of said driving signal to provide a square-wave signal, means for differentiating said square-wave signal to derive a trigger pulse signal, a monostable multivibrator connected to receive said trigger signal and responsive to said trigger signal by switching from a non-conductive state to a conductive state and remaining in said conductive state for a time interval equal to the storage time of said transistor, means connected to receive said square-wave signal and the output signal from said multivibrator and operable to subtract said output signal from said square-wave signal to obtain a remainder signal, and means for applying said remainder signal to drive said transistor.

7. Apparatus for driving a transistorized push-pull amplifier of the type including transistors having collector current storage time characteristics, said apparatus comprising:

means for generating a radio frequency driving signal, dividing means connected to receive said driving signal and operable to provide two oppositely-phased signals, squaring means connected to receive said oppositely-phase signals and to provide a first square-wave signal and a second square-wave signal of opposite phase to said first square-wave signal, means for differentiating each of said square-wave signals to derive trigger pulse signals, a monostable multivibrator connected to receive said trigger signals and responsive to said trigger signals by switching from a non-conductive state to a conductive state for a time interval equal to the storage time of the transistors of said push-pull amplifier, first subtracting means connected to receive said first square-wave signal and the output signal of said multivibrator and operable to subtract said output signal from said first square-wave signal to obtain a first remainder signal, means connected to apply said first remainder signal to drive a first transistor of said push-pull amplifier, second substracting means connected to receive second square-wave signal and the output signal of said multivibrator and operable to subtract said output signal from said second square-wave signal to obtain a second remainder signal, and means connected to apply said second remainder signal to drive a second transistor of said push-pull amplifier.

8. The apparatus of claim 7 wherein:

said dividing means comprises a transformer having a primary winding connected to receive said driving signal and having a secondary winding provided with a grounded center-tap.

9. The apparatus of claim 8 wherein:

said squaring means comprises first and second saturation amplifiers each connected to a respective end of said secondary winding.

10. The apparatus of claim 9 wherein:

said first subtraction means comprises a first summing circuit having one input connected to the output of said first saturation amplifier and having another input connected to the output of said multivibrator, and said second subtraction means comprises a second summing circuit having one input connected to the output of said second saturation amplifier and having another input connected to the output of said multivibrator.

References Cited

UNITED STATES PATENTS 3,421,099 1/1969 O'Malley ------------ 330—15

DONALD D. FORRER, Primary Examiner

J. ZAZWORSKY, Assistant Examiner

U.S. Cl. X.R.

307—300; 330—15